Sept. 21, 1943.   P. D'ZIMBA   2,330,035
COMBINATION WOOD WORKING MACHINE
Filed Sept. 21, 1940   4 Sheets-Sheet 1

INVENTOR.
Peter D'Zimba
BY
Gifford, Scull, & Burgess

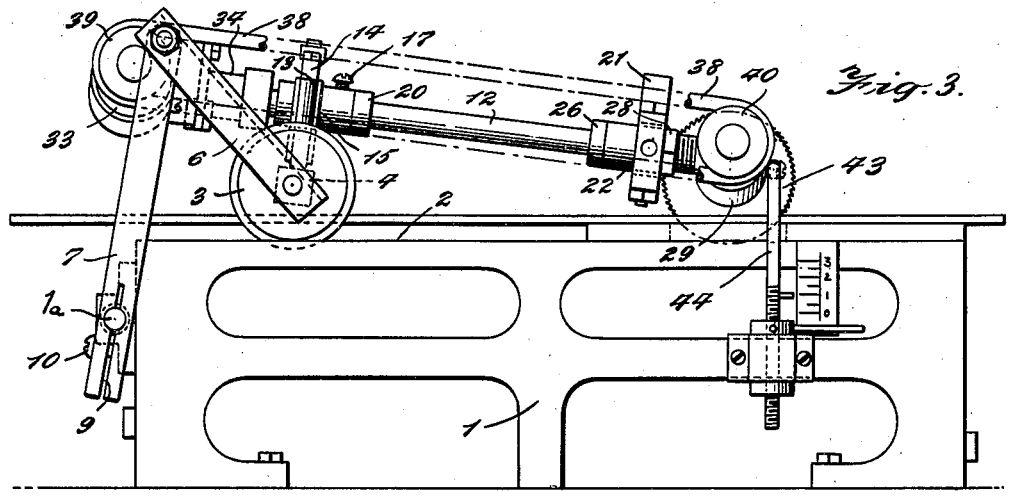
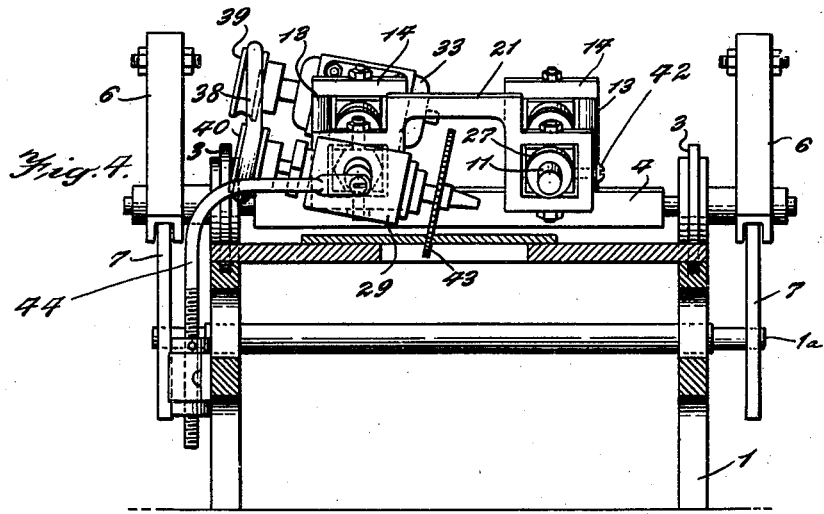
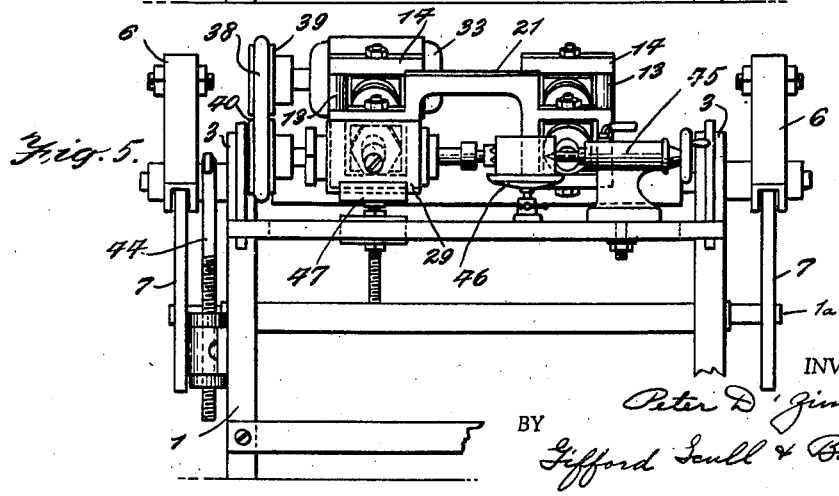

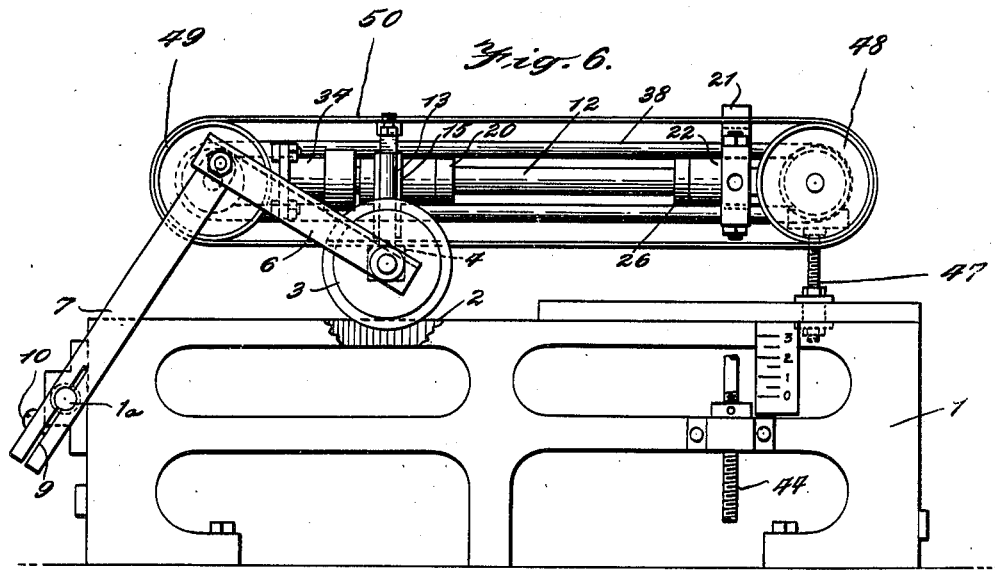
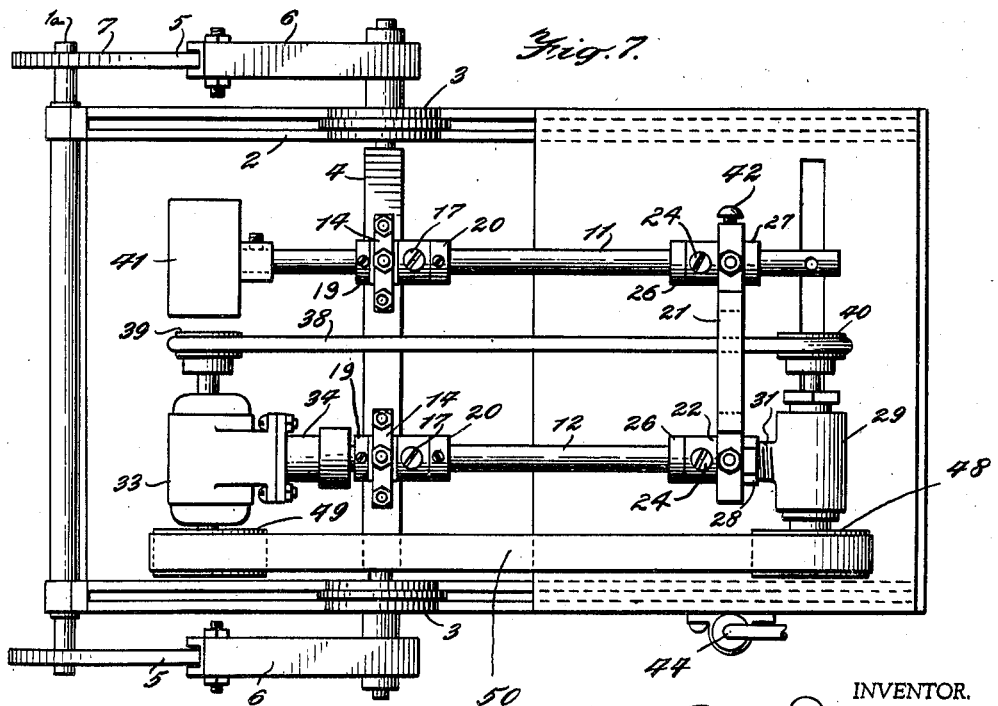

INVENTOR.
Peter D'Zimba
BY Gifford, Scull & Burgess

Patented Sept. 21, 1943

2,330,035

UNITED STATES PATENT OFFICE 2,330,035

COMBINATION WOODWORKING MACHINE

Peter D'Zimba, Jersey City, N. J.

Application September 21, 1940, Serial No. 357,733

13 Claims. (Cl. 33—23)

This invention relates to improvements in a combination wood working machine. It is the purpose of this invention to provide a wood working machine which can be applied to a wide variety of wood working operations and to provide means whereby such conversion may be readily and effectively made.

Other objects and advantages of my invention will appear from the following description and the drawings.

In the accompanying drawings,

Fig. 3 is a side view of a machine embodying my invention arranged for operation as a circular saw.

Fig. 4 is a front view in partial section of the machine as illustrated in Fig. 3.

Fig. 5 is a front view of a machine embodying my invention arranged for operation as a lathe.

Fig. 6 is a side view of a machine embodying my invention arranged for operation as a belt sander.

Fig. 7 is a plan view of the machine as illustrated in Fig. 6.

Figure 1:
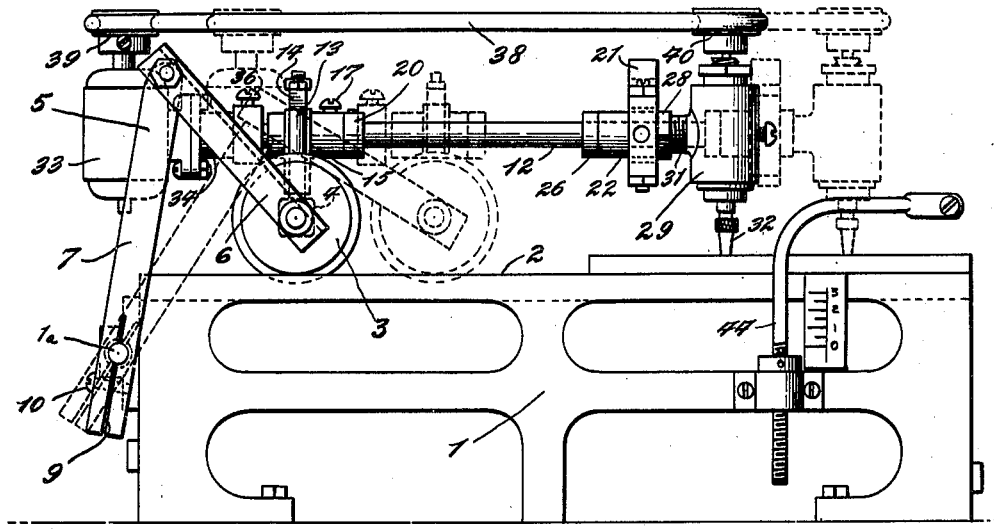
Fig. 1 is a side view of a machine embodying my invention arranged for operation as a wood carver.
Figure 2:
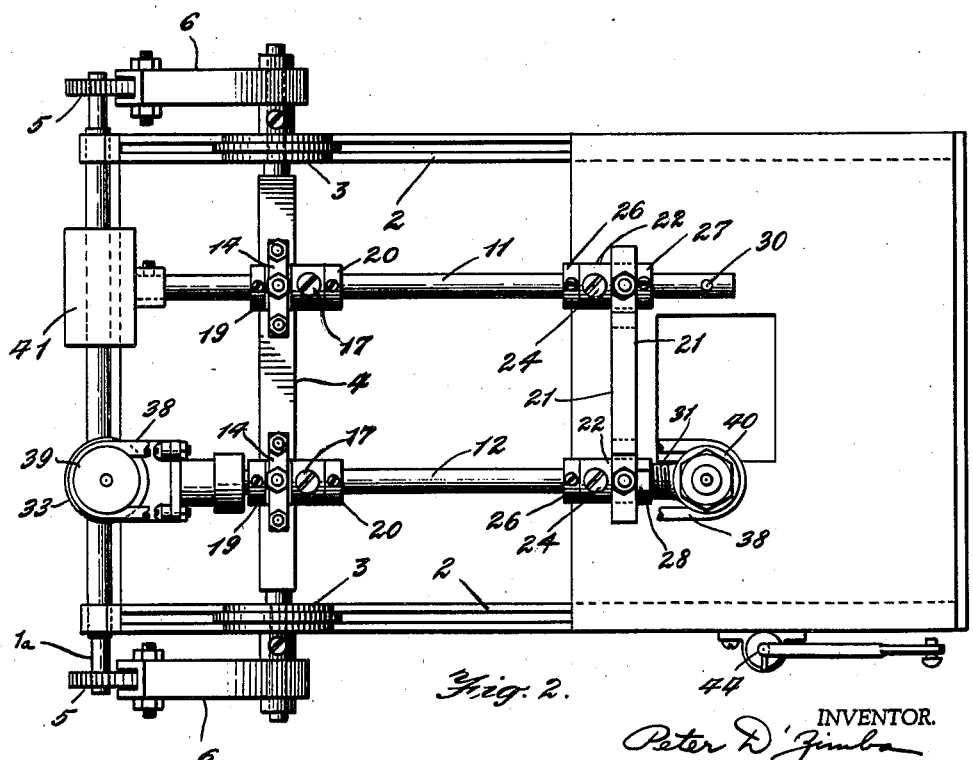
Fig. 2 is a plan view of apparatus as illustrated in Fig. 1.
Figure 8:
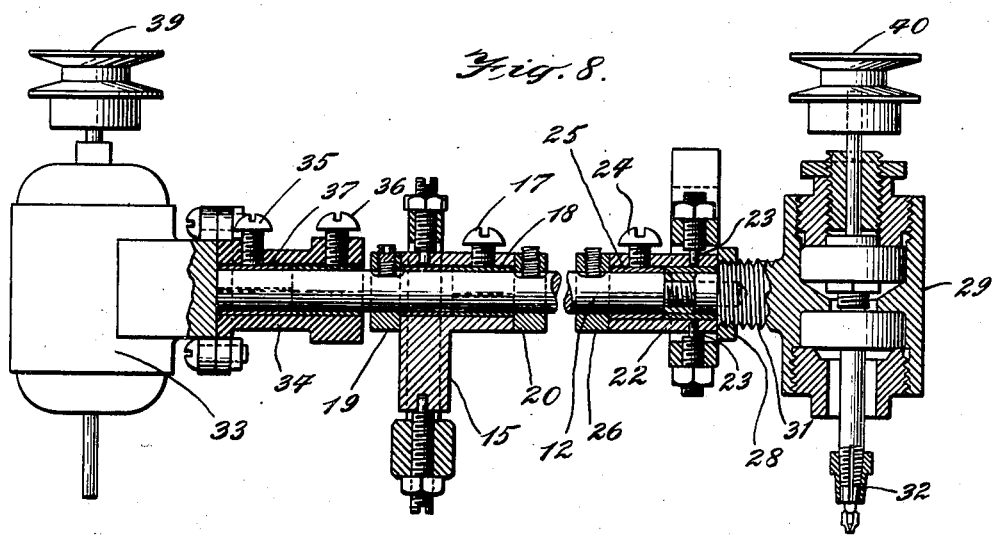
Fig. 8 is a side view in partial section of the motor and spindle supporting arm of a wood working machine embodying my invention.
Figure 9:
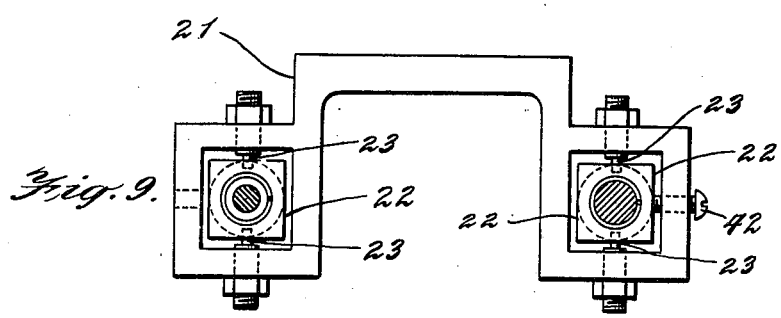
Fig. 9 is a section taken along the line 9—9 of Fig. 8.
Figure 10:
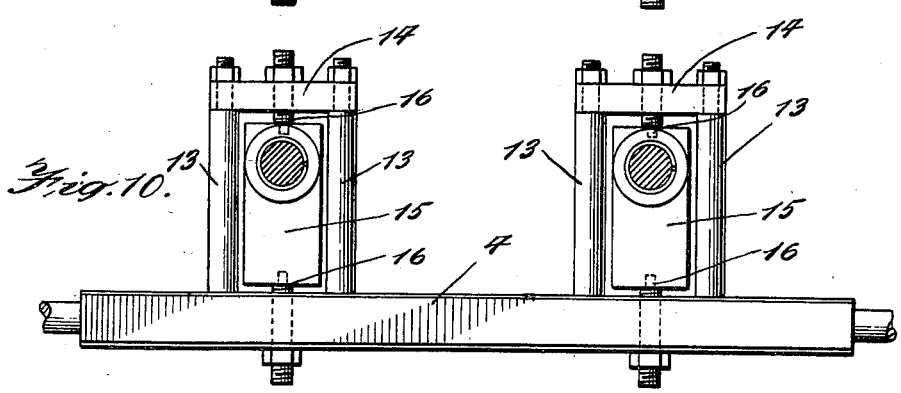
Fig. 10 is a section taken along the line 10—10 of Fig. 8.

Referring to the drawings in detail, a combination wood working machine is illustrated in which there is a frame 1 which has a pair of spaced parallel tracks 2 on its upper side. A movable carriage member consisting of a pair of wheels 3 running in the tracks 2 and an axle 4, is supported by the frame 1 and carries a tracing pantograph mechanism. To insure uniform movement of the carriage member on the tracks 2 the axle 4 is connected to the frame 1 by a pair of linkages 5 which have a knee-like action. The linkages 5 have two arms 6 and 7 secured together by a pin 8. The free end of the arm 6 of each of the linkages is journaled on an end of the axle 4 which extends beyond the wheels 3. The free end of the arm 7 of each of the linkages is journaled on a shaft 1a mounted on the frame 1. The manual force necessary to move the arm 7 about the shaft 1a is regulated by adjusting the friction of the bearing between the arm 7 and the shaft 1a, for this purpose there is a slot 9 in the arm 7 extending from the bearing to the end of the arm and a screw 10 connecting the slotted portions of the arm so that the friction of the bearing may be changed by adjusting the screw 10.

The pantograph mechanism has a pair of spaced parallel arms 11 and 12 held in pivotal mountings on the axle 4 of the movable carriage member between the wheels 3. These mountings consist of a pair of vertical posts 13 having a cross member 14 extending between their upper ends. Between the posts 11 a pivoted arm-holding member 15 is mounted on pivots 16 extending from the cross-member 14 and the axle 4 thus permitting the arm-holding members to pivot about a vertical axis.

The arm-holding members 15 have a sleeve-like projection extending from their front face and an opening therethrough through which the arms pass. The arms 11 and 12 are held against turning by set screws 17 in the sleeve-like projections of the pivoted members 15. To prevent scoring of the arms the set screws 17 bear against split bushings 18 located inside the openings in the arm-holding members 15 to clamp the arms in place.

To prevent lateral movement of the arms relative to the arm-holding members 15, collars 19 and 20 bearing against opposite faces of the arm-holding members 15 are secured to the arms.

The arms 11 and 12 are held in spaced parallel relation by an arm-connecting bar 21 placed a distance from the mountings on the axle 4. The arm-connecting bar 21 has a pair of spaced openings in which pivoted arm-holding members 22 are mounted in the openings on pivots 23 to turn about a vertical axis. The pivoted members 22 are similar to the pivoted members 15 having sleeve-like projections and openings therethrough through which the arms pass. These sleeve-like projections extend from the rear face of the pivoted members 22. Set screws 24 in the sleeve-like projections hold the arms against turning and bear against split bushings 25 located inside the openings in the arm-holding members 22 to clamp the arms 11 and 12 in place.

To prevent lateral movement of the arm 11, collars 26 and 27 bearing against opposite faces of the arm-holding member 22 are secured to the arm. And on the arm 12 the collar 26 bears against one face of the arm-holding member 22 and bearing against the opposite face there is a lock nut 28 on a spindle head 29 carried at the outer end of the arm 12. This arrangement will be described in greater detail hereinafter.

With the above described arrangement the arms 11 and 12 may be fixed relative to each other and may be freely rotated to any desired position when the set screws 17 and 24 are loosened without disturbing the relation of the arms to each other in any way.

The arm 11 extends beyond the arm-connecting bar 21 and carries a tracing tool 30 at its outer end. The arm 12 extends into the arm-holding member 22 and has a threaded portion of reduced diameter at its end on which the spindle head 29, previously mentioned, is secured.

The spindle head 29 has a fitting 31 extending at right angles to its body for securing it to the arm 12. The fitting 31 threads onto the threaded end of arm 12 and is circular in section having at its outer end of the same diameter as the arm 12 so that it will fit into the openings in the arm-holding member 22. Immediately adjacent this portion of reduced diameter there is an enlarged portion which is externally threaded on which there is a lock nut 28. The spindle head is threaded on the end of the arm 12 until its tool-holding means 32 is in exact alignment with the tracing tool 30 in the arm 11. In doing this the enlarged portion of the fitting 31 will be brought adjacent the end of the outside of the pivoted member 22 and by tightening the lock nut 28 against the outside of the arm-holding member 22, the spindle head will be locked in place. This may be done with the spindle head in any position and the arm 12 is then rotated in the arm-holding members 15 and 22 until the axes of the tracing tool 30 and the spindle head 29 are parallel.

On the end of the arm 12 projecting behind the axle 4 an electric motor 33 is carried for driving the tool carried by the spindle head 29. The electric motor 33 is mounted on a sleeve 34 which surrounds the end of the arm 12 and which is held on the arm 12 by set screws 35 and 36 which bear against a split bushing 37 located inside the sleeve 34 to clamp the motor in place on the arm 12. Thus the motor 33 may be turned relative to the arm 12 so as to bring it in position corresponding approximately to that in which the spindle head 29 has been locked.

The motor 33 drives the tool carried by the spindle head 29 through a belt 38 which runs between a driving pulley 39 on the shaft of the motor 33, and a driven pulley 40 on one end of a shaft which drives the tool-holding means 32 of the spindle head 29.

To counter-balance the weight carried by the arm 12 a counterweight 41 is carried on the end of the arm 11.

To avoid interference with the belt 38 when the spindle head 29 and the motor 33 are, for example, in a horizontal position or to permit the passage of material being worked on, the cross bar of the arm-connecting bar 21 is raised to provide an enlarged opening beneath the cross bar at the central portion of the arm-connecting bar 21.

When the spindle head 29 is locked in a vertical position and a tracing tool 30 is carried at the outer end of the arm 11, the machine may be used as a tracing machine for duplicating wood carving. Or the pivoted member 22 in the opening of the arm-connecting bar 21 may be secured against pivotal movement by inserting a screw 42 through the arm-connecting bar 21 into the side of the member 22 thus securing the member rigidly to the arm-connecting bar 21. With this arrangement the machine may be used for straight routing and similar purposes as now it will not be possible to move the arms 11 and 12 and the spindle head 29 laterally of the frame in a horizontal plane.

To use the machine for circular sawing, the spindle head 29 is placed in a horizontal position by turning the arm 12 and a circular saw 43 is secured to the tool holder 32. In this position the spindle head is supported from the frame by an arm 44 which may be adjusted to hold the spindle head at any desired height. In such instances where the spindle head is horizontal, the screw 42 will preferably be inserted in the arm-holding members 22, as previously described, to hold the arms against lateral movement thus giving added rigidity to the now locked pantograph mechanism of the machine.

If it is desired to operate the machine as a lathe, a dead center 45 and a tool rest 46 may be mounted on the front of the frame and the spindle head 29 will be placed in a horizontal position and secured to the frame in line with the dead center 45 by a supporting member 47.

The machine may be operated as a belt sander by turning the arm 12 so that the motor 33 and the spindle head 29 are in a horizontal position. A drum 48 is placed on the tool holder 32 of the spindle head 29 and a drum 49 is placed on a shaft extending from the motor 33. A sanding belt 50 is carried on the drums 48 and 49. Here again the mechanism is held in place on the frame by the supporting member 47.

It will be understood that my machine may be arranged for other uses besides the ones specifically mentioned herein and by mentioning these examples specifically it is not intended to place limitations on my invention.

I claim:

1. In a combination wood working machine, a pantograph mechanism comprising a movable carriage member consisting of a pair of wheels and an axle carried by the wheels, a pair of pivoted arm-holding members carried on the axle, an arm journaled in each of the pivoted members, an arm-connecting bar arranged and constructed to hold the arms in spaced parallel relation placed at a distance from the axle, a second pair of pivoted arm-holding members carried by the arm-connecting bar, through which the arms extend, each of the arms being journaled therein thereby permitting the arms to be rotated in said pivoted members, means on the pivoted members to secure the arms against rotation and means carried on the arms adjacent the pivoted members to prevent lateral movement of the arms relative to the pivoted members when the arms are rotated.

2. In a combination wood working machine, a pantograph mechanism comprising a movable carriage member consisting of a pair of wheels and an axle carried by the wheels, a pair of pivoted arm-holding members carried on the axle, an arm journaled in each of the pivoted members, an arm-connecting bar arranged and constructed to hold the arms in spaced parallel relation placed at a distance from the axle, a second pair of pivoted arm-holding members carried by the arm connecting bar, the arms being journaled therein thereby permitting the arms to be rotated in said pivoted members, means on the pivoted members to secure the arms against rotation, means carried on the arms adjacent the pivoted members to prevent lateral movement of the arms relative to the pivoted members, a tracing tool carried at the end of one arm, a spindle head carried at the end of the other arm, and means to lock the spindle head in position on the arm.

3. In a wood working machine, a movable carriage member, a pair of arms pivotally mounted on the carriage member, the arms being pivoted to be movable about a vertical axis, an arm-connecting bar pivotally secured to the arms at a distance from the carriage member and holding the arms in spaced parallel relation, the arms being journaled in the pivotal mountings of the carriage member and in the arm-connecting bar and rotatable therein, and means to fasten the arms against rotation in the pivotal mountings on the carriage member and the arm-connecting bar.

4. In a wood working machine, a movable carriage member, a pair of arms pivotally mounted on the carriage member, the arms being pivoted to be movable about a vertical axis, an arm-connecting bar pivotally secured to the arms at a distance from the carriage member and holding the arms in spaced parallel relation, the arms being journaled in the pivotal mountings of the carriage member and in the arm-connecting bar and rotatable therein, means to fasten the arms against rotation in the pivotal mountings on the carriage member and the arm-connecting bar, and means on the arms to prevent lateral movement of the arms relative to the pivotal mountings during rotation.

5. A combination wood working machine comprising a frame, a movable carriage member carried on the frame, a pair of spaced arms pivotally mounted on the carriage member, an arm-connecting bar pivotally secured to the arms at a distance from the carriage member and holding the arms in spaced parallel relation, said arms being journaled in the pivotal mountings of the carriage member and of the arm-connecting bar and rotatable therein, and means in the pivotal mountings to secure the arms against such rotation.

6. A combination wood working machine including a frame, a pair of spaced tracks on the frame, a pantograph mechanism comprising a pair of wheels running on the tracks, an axle extending between and supported on the wheels, a pair of pivoted mountings carried by the axle, an arm carried in each of the pivoted mountings, an arm-connecting bar pivotally secured to the arms at a distance from the axle to hold the arms in spaced parallel relation, the arms being journaled in the pivoted mountings on the axle and the arm-connecting bar and rotatable therein, means to clamp the arms against rotation, and means secured to the ends of the axle connecting the axle to the frame to insure uniform movement of the wheels and axle relative to the frame.

7. A combination wood working machine including a frame, a pair of spaced tracks on the frame, a pantograph mechanism comprising a pair of wheels running on the tracks, an axle supported by the wheels, a pair of pivoted mountings carried by the axle, an arm carried in each of said mountings, an arm-connecting bar to hold the arms in spaced parallel relation, a second pair of pivoted mountings carried by the arm-connecting bar, each of said mountings of the arm-connecting bar carrying one of the arms, each arm being rotatably journaled in its respective pivoted mountings, means to clamp the arms against rotation, and means connecting the axle to the frame to insure uniform movement of the wheels and axle relative to the frame comprising a linkage having a jointed section and being journaled at one end on the axle and at the other end on the frame.

8. A combination wood working machine including a frame, a pair of spaced tracks on the frame, a pantograph mechanism comprising a pair of wheels running on the tracks, an axle connecting the wheels, a pair of pivoted mountings carried by the axle, an arm carried in each of said mountings, an arm-connecting bar to hold the arms in spaced parallel relation, a second pair of pivoted mountings carried by the arm-connecting bar, each of said mountings of the arm-connecting bar carrying one of the arms, each arm being journaled in its respective set of pivoted mountings and rotatable therein, means to clamp the arms against rotation, means carried on each of the arms adjacent the pivoted mountings to prevent lateral movement of the arms relative to said mountings, and means connecting the axle to the frame to insure uniform movement of the wheels and axle relative to the frame comprising a linkage having a jointed section journaled at one end on the axle and at the other end on the frame, and adjustable means carried by the linkage to regulate frictionally the movement of the linkage.

9. A combination wood working machine including a frame, a pair of spaced tracks on the frame, a pair of wheels running on the tracks, an axle connecting the wheels, means connecting the axle to the frame to insure uniform movement of the wheels and axle relative to the frame comprising a pair of linkages, each linkage consisting of a jointed section journaled at one end on an end of the axle and at the other end on the frame, and adjustable means for imposing a frictional resistance to the movement of the linkages.

10. A combination wood working machine including a frame, a pair of spaced tracks on the frame, a pantograph mechanism comprising a pair of wheels running on the tracks, an axle supported by the wheels, a pair of pivoted mountings carried by the axle, an arm carried in each of said mountings, an arm-connecting bar to hold the arms in spaced parallel relation, a second pair of pivoted mountings carried by the arm-connecting bar, each of said mountings of the arm-connecting bar carrying one of the arms, each being rotatably journaled in its respective pivoted mountings, means to clamp the arms against rotation, and means connecting the axle to the frame to insure uniform movement of the wheels and axle relative to the frame comprising a linkage having a jointed section and being journaled at one end on the axle and at the other end on the frame and adjustable means carried by the linkage to regulate frictionally the movement of the linkage.

11. A combination wood working machine including a frame, a pair of spaced tracks on the frame, a pantograph mechanism comprising a pair of wheels running on the tracks, an axle supported by the wheels, a pair of pivoted mountings carried by the axle, an arm carried in each of said mountings, an arm-connecting bar holding the arms in spaced parallel relation, a second pair of pivoted mountings carried by the arm-connecting bar, each of said mountings carrying one of the arms, each arm being rotatably journaled in its respective pivoted mountings, means to secure the arms against rotation, and means to lock the arms against lateral movement relative to the frame.

12. A combination wood working machine including a frame, a pair of spaced tracks on the frame, a pantograph mechanism comprising a pair of wheels running on the tracks, an axle supported by the wheels, a pair of pivoted mountings carried by the axle, an arm carried in each of said mountings, an arm-connecting bar holding the arms in spaced parallel relation, a second pair of pivoted mountings carried by the arm-connecting bar, each of said mountings carrying one of the arms, each arm being rotatably journaled in its respective pivoted mountings, means to secure the arms against rotation, means to lock the arms against lateral movement relative to the frame, and a fixed support capable of supporting the free end of arms in a fixed position.

13. A combination wood working machine including a frame, a pair of spaced tracks on the frame, a pantograph mechanism comprising a pair of wheels running on the tracks, an axle supported by the wheels, a pair of pivoted mountings carried by the axle, an arm carried in each of said mountings, an arm-connecting bar holding the arms in spaced parallel relation, said arm-carrying bar having a raised central portion, a second pair of pivoted mountings carried by the arm-connecting bar, each of said mountings carrying one of the arms, each arm being rotatably journaled in its respective pivoted mountings, means to secure the arms against rotation, and means to lock the arms against lateral movement relative to the frame.

PETER D'ZIMBA.